(12) United States Patent
Angelo et al.

(10) Patent No.: US 10,400,422 B2
(45) Date of Patent: Sep. 3, 2019

(54) FENDER MOUNTING SYSTEM

(71) Applicant: Caterpillar Inc., Peoria, IL (US)

(72) Inventors: Collins Angelo, Chennai (IN); Andrew Rummer, Mt. Zion, IL (US)

(73) Assignee: Caterpillar Inc., Deerfield, IL (US)

( * ) Notice: Subject to any disclaimer, the term of this patent is extended or adjusted under 35 U.S.C. 154(b) by 649 days.

(21) Appl. No.: 14/685,265

(22) Filed: Apr. 13, 2015

(65) Prior Publication Data

US 2015/0299982 A1 Oct. 22, 2015

Related U.S. Application Data

(60) Provisional application No. 61/980,079, filed on Apr. 16, 2014.

(51) Int. Cl.
| | |
|---|---|
| *B62D 25/18* | (2006.01) |
| *E02F 9/08* | (2006.01) |
| *B62D 25/16* | (2006.01) |
| *E02F 3/76* | (2006.01) |

(52) U.S. Cl.
CPC .......... *E02F 9/0858* (2013.01); *B62D 25/163* (2013.01); *B62D 25/168* (2013.01); *B62D 25/186* (2013.01); *E02F 3/764* (2013.01); *E02F 3/765* (2013.01)

(58) Field of Classification Search
CPC .. B62D 25/186; B62D 25/168; B62D 25/163; B62D 25/166
See application file for complete search history.

(56) References Cited

U.S. PATENT DOCUMENTS

| | | | |
|---|---|---|---|
| 159,047 A | * | 1/1875 | Shoeninger .......... B62D 25/186 280/157 |
| 460,053 A | * | 9/1891 | Paine .................. B62D 25/186 280/157 |

(Continued)

FOREIGN PATENT DOCUMENTS

| | | |
|---|---|---|
| DE | 3214901 A1 | 10/1983 |
| GB | 226200 A | 5/1925 |

(Continued)

OTHER PUBLICATIONS

"Bending Basics"; Steve Benson; https://www.thefabricator.com/article/bending/bending-basics-the-hows-and-whys-of-springback-and-springforward; retrieved Feb. 15, 2019.*

(Continued)

*Primary Examiner* — Emma K Frick
(74) *Attorney, Agent, or Firm* — Leydig, Voit & Mayer

(57) ABSTRACT

A fender mounting system for mounting a fender disposed partially around the circumference of a wheel can include a first bracket, a second bracket, and a third bracket. The first bracket can be attached to a leading radial edge of the fender and depends toward an axis line associated with the wheel. The second bracket can be attached to the radial mid-section of the fender and depends toward the axis line. The third bracket can be attached to a radial trailing edge and depends radial toward the axis line. In an embodiment, the first and third brackets can resist lateral forces along the axis line and the second bracket allows deflection due to lateral forces along the axis line.

17 Claims, 6 Drawing Sheets

(56) References Cited

U.S. PATENT DOCUMENTS

| | | | | |
|---|---|---|---|---|
| 478,585 A * | 7/1892 | Freese | ............... | B62D 25/186 280/157 |
| 531,171 A * | 12/1894 | Fleming | ............... | B62D 25/186 280/157 |
| 534,868 A * | 2/1895 | Elder | ............... | B62D 25/186 280/157 |
| 657,972 A * | 9/1900 | Ward | ............... | B62D 25/186 280/157 |
| 726,398 A * | 4/1903 | Brown | ............... | B62D 25/186 280/157 |
| 767,242 A * | 8/1904 | Reichle, Jr. | ............... | B62D 25/186 280/157 |
| 857,747 A * | 6/1907 | McCauley | ............... | B62D 25/186 280/157 |
| 1,454,738 A * | 5/1923 | Hilton | ............... | B62D 25/186 280/847 |
| 1,470,970 A | 10/1923 | Groff | | |
| 1,613,443 A * | 1/1927 | Amato | ............... | B62D 25/16 280/157 |
| 1,618,919 A * | 2/1927 | Dauteuil | ............... | B62D 25/186 280/157 |
| 2,057,322 A * | 10/1936 | Balthazor | ............... | B62D 25/186 280/848 |
| 3,341,222 A * | 9/1967 | Roberts | ............... | B62D 25/16 280/851 |
| 4,591,178 A | 5/1986 | Mortvedt et al. | | |
| 5,074,573 A * | 12/1991 | Dick | ............... | B62D 25/16 248/289.31 |
| 5,169,167 A | 12/1992 | Willson et al. | | |
| 5,511,808 A | 4/1996 | Rowland | | |
| 5,839,743 A | 11/1998 | Weinkauf | | |
| 6,109,621 A * | 8/2000 | Hettich | ............... | B62D 25/186 280/124.103 |
| 6,349,954 B1 | 2/2002 | Deziel | | |
| 6,648,373 B2 * | 11/2003 | Hawes | ............... | B62D 25/168 280/154 |
| 7,810,829 B2 | 10/2010 | Hawes | | |
| 7,832,751 B2 * | 11/2010 | Fischer | ............... | B62J 15/00 280/154 |
| 8,388,003 B2 * | 3/2013 | Wellman | ............... | B62D 25/186 280/157 |
| 8,882,121 B2 * | 11/2014 | Ducroquet | ............... | B62D 25/163 280/157 |
| 9,545,955 B2 * | 1/2017 | Xu | ............... | B62D 25/166 |
| 2006/0108765 A1 | 5/2006 | Teich | | |
| 2007/0182151 A1 * | 8/2007 | Aulabaugh | ............... | B62D 25/161 280/849 |

FOREIGN PATENT DOCUMENTS

| | | |
|---|---|---|
| JP | 2011-201356 A | 10/2011 |
| JP | 2011201356 | 10/2011 |

OTHER PUBLICATIONS

Korean Intellectual Property Office, International Search Report in International Patent Application No. PCT/US2015/025579, dated Jul. 14, 2015; 3 pp.

Korean Intellectual Property Office, Written Opinion in International Patent Application No. PCT/US2015/025579, dated Jul. 14, 2015; 8 pp.

* cited by examiner

FENDER MOUNTING SYSTEM

CROSS REFERENCE TO RELATE APPLICATIONS

This application claims priority to U.S. provisional application 61/980,079, filed on Apr. 16, 2014, which is herein incorporated by reference in its entirety.

TECHNICAL FIELD

The present disclosure is generally directed to a mounting system for attachment of a fender to a mobile machine and, more particularly, the present disclosure is directed to a robust mounting system for attaching a front fender to a machine like a motor grader, which may be subjected to weighed loads from materials such as mud and snow, and to vibrational cyclic loads.

BACKGROUND

Fenders are often utilized on mobile machines that are capable of being propelled over a surface and are generally disposed proximate the wheels of the machine to deflect rocks, snow or other materials from being kicked up from the surface by the wheels. If the fender is proximate the wheels, it may be configured to also accommodate vertical motion of the wheel with respect to the frame of the machine due to the suspension system. In addition, in some machines like motor graders where the front wheels are steering wheels adapted to turn with respect to the frame to change the direction of travel, the fenders may be configured to turn with the wheels. An example of fenders designed to accommodate relative motion of the wheels with respect to the frame is disclosed in U.S. Pat. No. 5,839,743 ("the '743 patent"). The '743 patent describes, in part, a fender for the steering wheels of a machine such as a motor grader that may be connected to the frame by a mounting bracket. The mounting bracket includes a plurality of straps fastened to the back of the fender that connect to a particular location on the frame that moves with the wheels when displaced by the suspension system or steering system of the motor grader. It will be appreciated that relative motion of the fender in the various directions described herein may result in cyclic vibrations being imparted to the fender and its mounting system. The present disclosure is directed to a mounting system for mounting the fender to a machine that is designed to accommodate such vibrations and forces.

SUMMARY

In one aspect, the present disclosure relates to a mounting system for mounting a fender having a generally curved shape to a mobile machine such that a curved fender is generally aligned with an axis line associated with a wheel of the machine and partially disposed around the wheel. The mounting system can include a first bracket having a first mounting portion adapted to mount to a frame of the mobile machine at a first machine location proximate a wheel hub and a first attachment portion adapted to connect proximate to a leading radial edge of the fender. The first bracket further include a first extension leg extending between the first mounting portion and the first attachment portion with a first flection therein providing an angle in the first extension leg. The mounting system can include a second bracket having a second mounting portion adapted to mount to the frame at a second machine location proximate the wheel hub and a second attachment portion adapted to connect to a radial midsection of the fender. The second bracket includes a second extension leg extending between the first mounting portion and the first attachment portion with a second flection therein to provide an angle in the second extension leg.

In another aspect, the disclosure provides a method of mounting a fender to a frame of a mobile machine having fore/aft directions and up/down directions. The method involves disposing a fender having a curved shape to partially circumscribe a wheel of a mobile machine and to align with an axis line of rotation associated with the wheel, wherein the axis line is normal to the fore/aft directions and the up/down directions. According to the method, a first bracket is attached proximate to a leading radial edge of the fender and mounted proximate to the wheel hub. The first bracket can include a first flection adapted for deflecting in response to imparted forces on the fender. A second bracket is attached proximate to a radial midsection of the fender and mounted proximate to the wheel hub. The second bracket includes a second flection adapted for deflecting in response to imparted forces on the fender. Further, a third bracket is attached proximate to a trailing radial edge of the fender and mounted proximate to the wheel hub. The third bracket can include a third flection adapted for deflecting in response to imparted forces on the fender.

In yet another aspect, the disclosure describes a mounting system for mounting a fender to a mobile machine having fore/aft directions, inboard/outboard directions, and up/down directions. The mounting system includes a first bracket having a mounting portion adapted to mount to a frame of the mobile machine and a first attachment portion adapted to connect to a fender disposed partially around a wheel of the mobile machine. The first bracket can include a first extension leg between the first mounting portion and the first attachment portion, which has a first flection traversing a first major surface thereof. The first flection allows deflection of the fender in the fore/aft directions and the up/down directions. The mounting system can include a second bracket having a second mounting portion adapted to mount to the frame of the mobile machine and a second attachment portion adapted to connect to the fender. The second bracket can include a second extension leg between the second mounting portion and the second attachment portion which has a second flection traversing a second major surface thereof. The second flection allows deflection in the inboard/outboard directions and the up/down directions.

DETAILED DESCRIPTION

Figure 1:
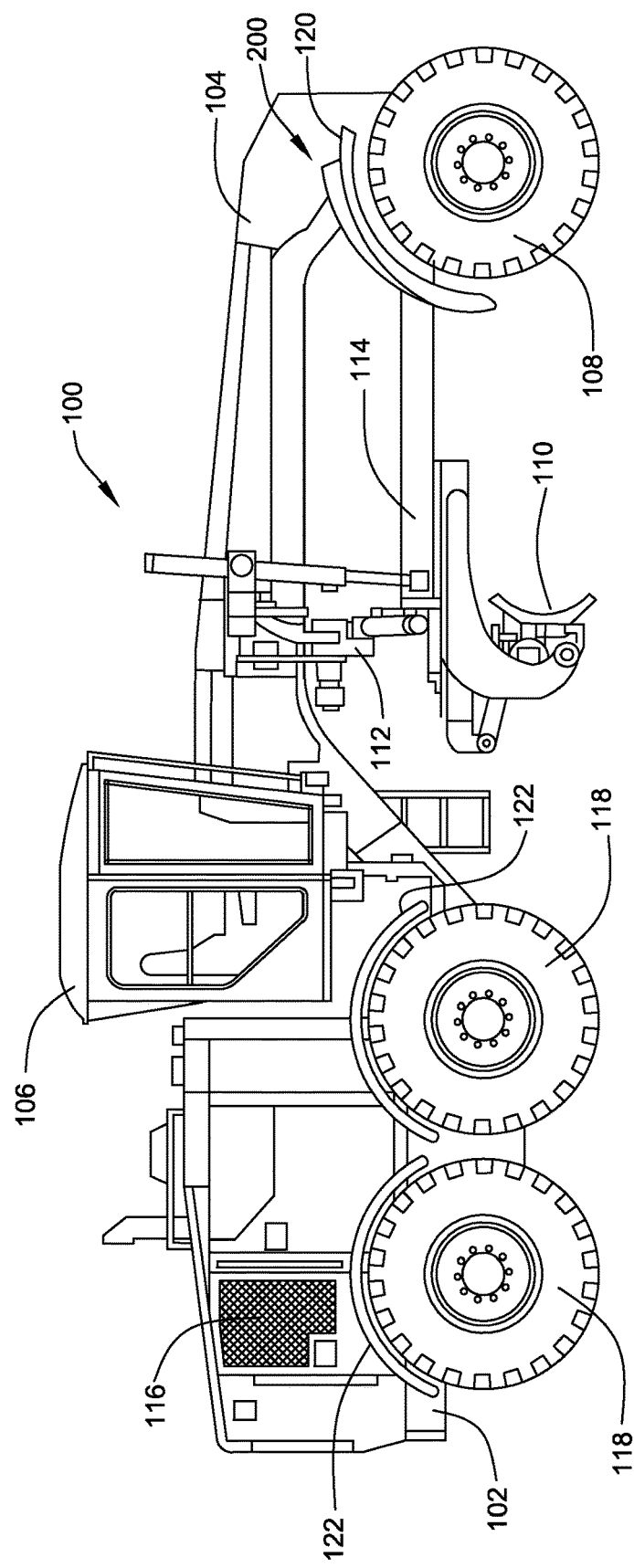
FIG. 1 is a side elevational view of a representative machine according to the present disclosure.

A side view of a machine 100, in this example a motor grader, is shown in FIG. 1. The term "machine" is used generically to describe any machine having at least one drive wheel that is directly driven by an engine or motor connected to the wheel, for example, by use of mechanical, electrical, or hydrostatic power. Such machines may be used to perform some type of operation associated with an industry such as mining, construction, farming, transportation, or any other industry. Examples of such machines known in the art include earth-moving machines, such as wheel loaders, excavators, backhoes, motor graders, material handlers, or the like. Moreover, an implement may be connected to the machine. Such implements may be utilized for a variety of tasks, including, for example, loading, compacting, lifting, brushing, and can include, for example, buckets, compactors, forked lifting devices, brushes, grapples, cutters, shears, blades, breakers/hammers, augers, and others The motor grader 100 shown in FIG. 1 generally includes a two-piece frame including an engine frame 102 and an implement frame 104. Alternatively, the motor grader 100 may include a unitary frame. The engine frame 102 in the embodiment shown is connected to the implement frame 104 by a pivot (not shown) so that the implement frame and drive frame may articulate with respect to each other to maneuver the motor grader. The implement frame 104 includes an operator's cab 106 and two front wheels 108 (only one visible) that contact the ground. In an embodiment, the front wheels 108 may be steering wheels that are adapted to turn or pivot laterally with respect to the implement frame 104 for steering the motor grader 100. A shovel or blade 110 is suspended along a mid-portion of the implement frame 104. The blade 110 can be selectively adjusted to engage the ground at various heights and angles to achieve a desired grade or contour while the motor grader 100 operates. Adjustment of the position of the blade 110 is accomplished by a system of actuators 112, while support for the load experienced by the blade 110 during operation is provided by a bar 114 that pivotally connects the implement frame 104 to the blade 110.

The engine frame 102 supports an engine (not visible), which is protected from the elements by an engine cover 116. The engine provides the power necessary to propel the motor grader 100 as well as to operate the various actuators and systems of the motor grader 100. In various embodiments, the engine may be an internal combustion engine, an electric engine, a hybrid engine, or any other suitable type of power source for powering the motor grader or similar machine. In the embodiment shown, the motor grader 100 is driven by two sets of drive wheels 118 (only one set visible), with each set including two wheels that are arranged in a tandem configuration. The drive wheels 118 can receive power from the engine via a suitable drive train or the like. In various embodiments, the drive wheels 118 may be fixed with respect to the engine frame 102, unlike the way in which the front wheels 108 can pivot with respect to the implement frame 104 for steering the machine. As will be appreciated, however, other machines may have different configurations and/or various other implements associated therewith.

The front wheels 108 may kick up dirt, snow, or other materials from the surface on which the motor grader 100 is moving, and fenders 120, supported by a mounting system 200, may be positioned over the front wheels 108 to deflect such materials. The fenders 120 may have a generally curved shape similar to the circular shape of the front wheels 108 and may be disposed radially around a portion of the wheel. For example, as illustrated in FIG. 1, the fender 120 may extend radially around approximately 90° of the circumference of the front wheels 108, or slightly more than 90° as the case may be, and can be oriented over the upper rear quarter of the wheels to prevent kicked-up material from projecting toward the operator's cab 106, where such materials could cause damage. Of course, in other embodiments, the fenders 120 may encompass more or less of the front wheel than is illustrated. To further prevent materials from being kicked-up off the ground, rear fenders 121 may be disposed partly about the drive wheels 118 as well.

Figure 2:
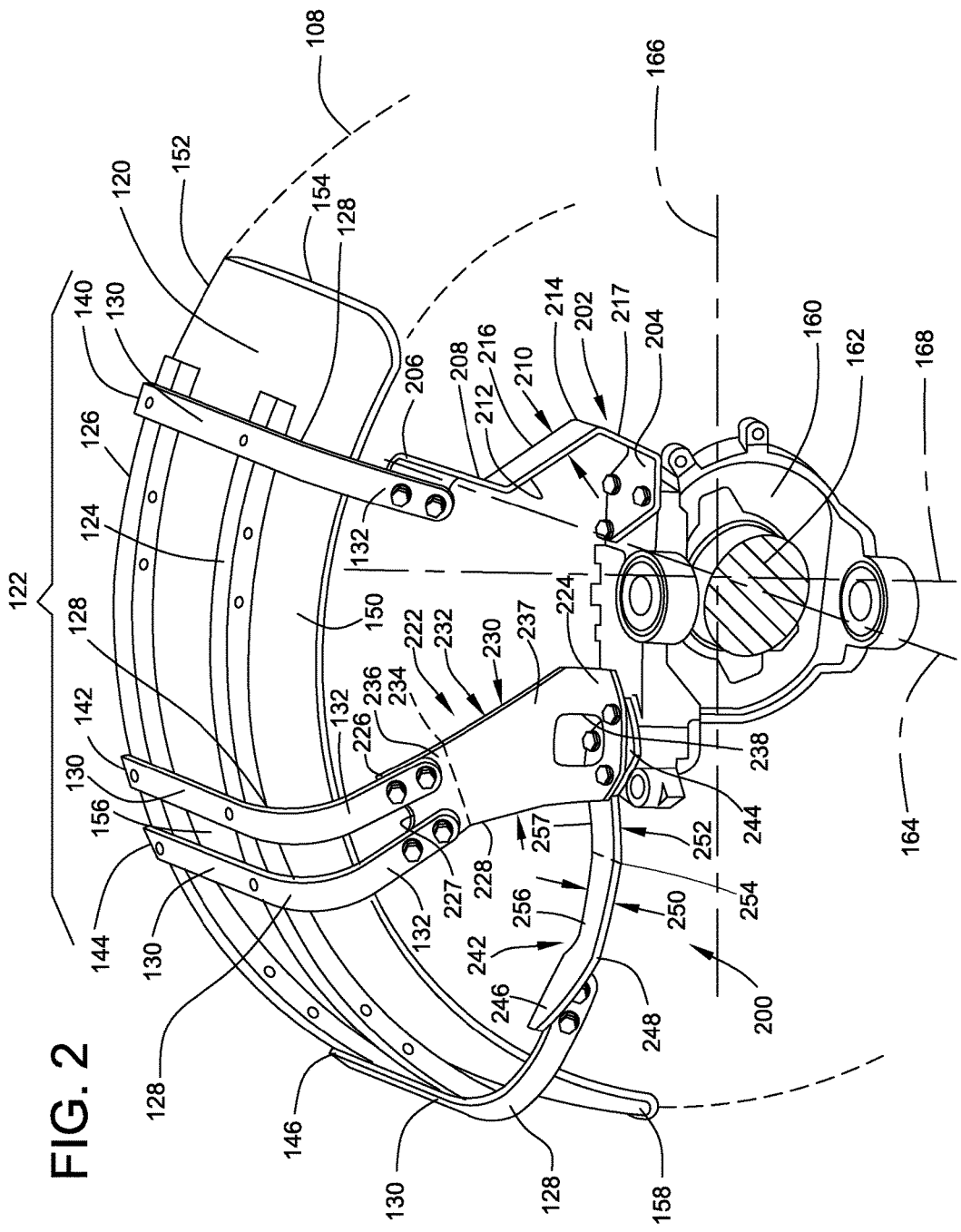
FIG. 2 is a perspective view of a fender mounted to a part of the frame of the mobile machine with an embodiment of the fender mounting system of the present disclosure.
Figure 3:
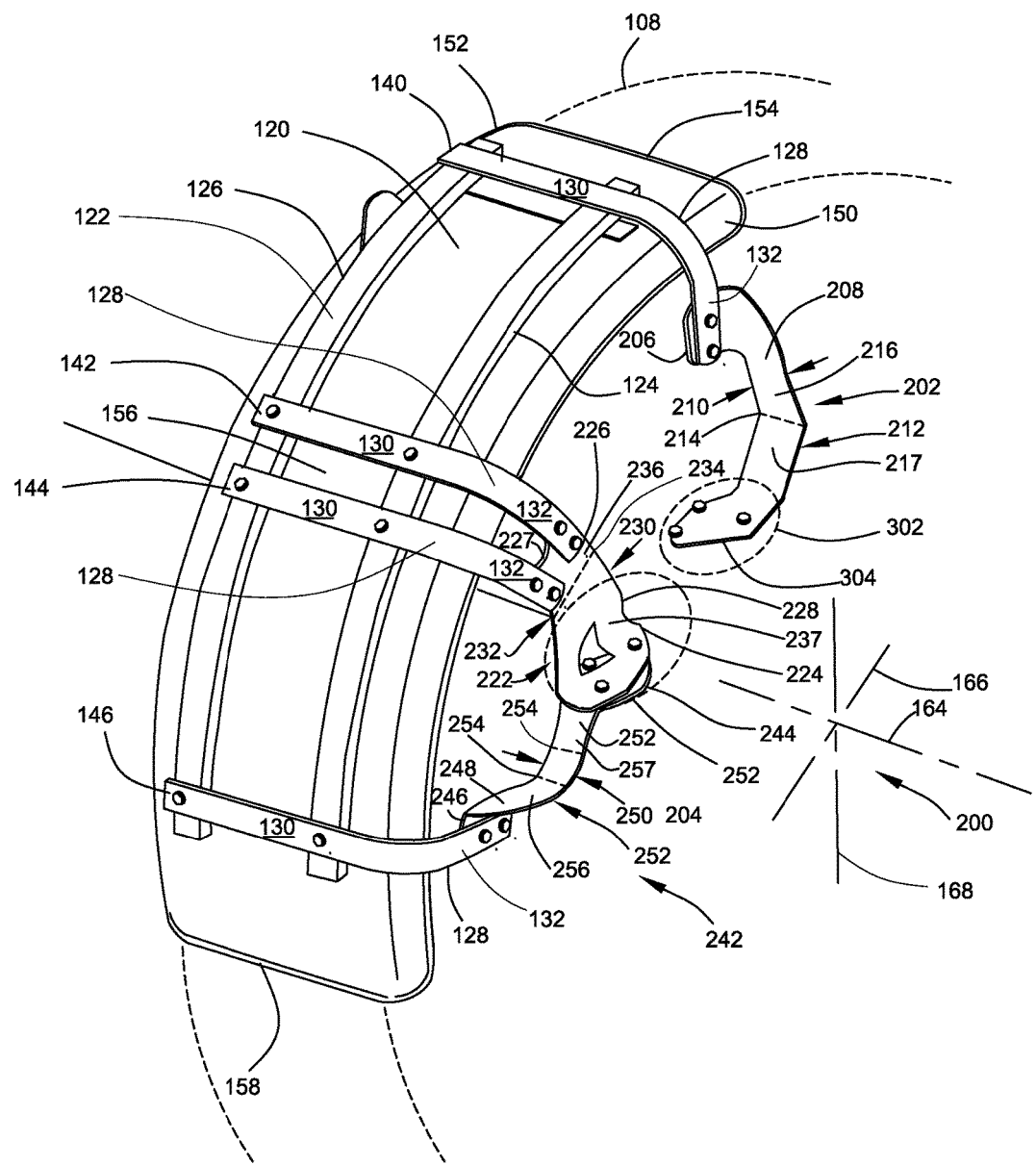
FIG. 3 is a perspective view of an embodiment of the fender mounting system of the present disclosure.
Figure 4:
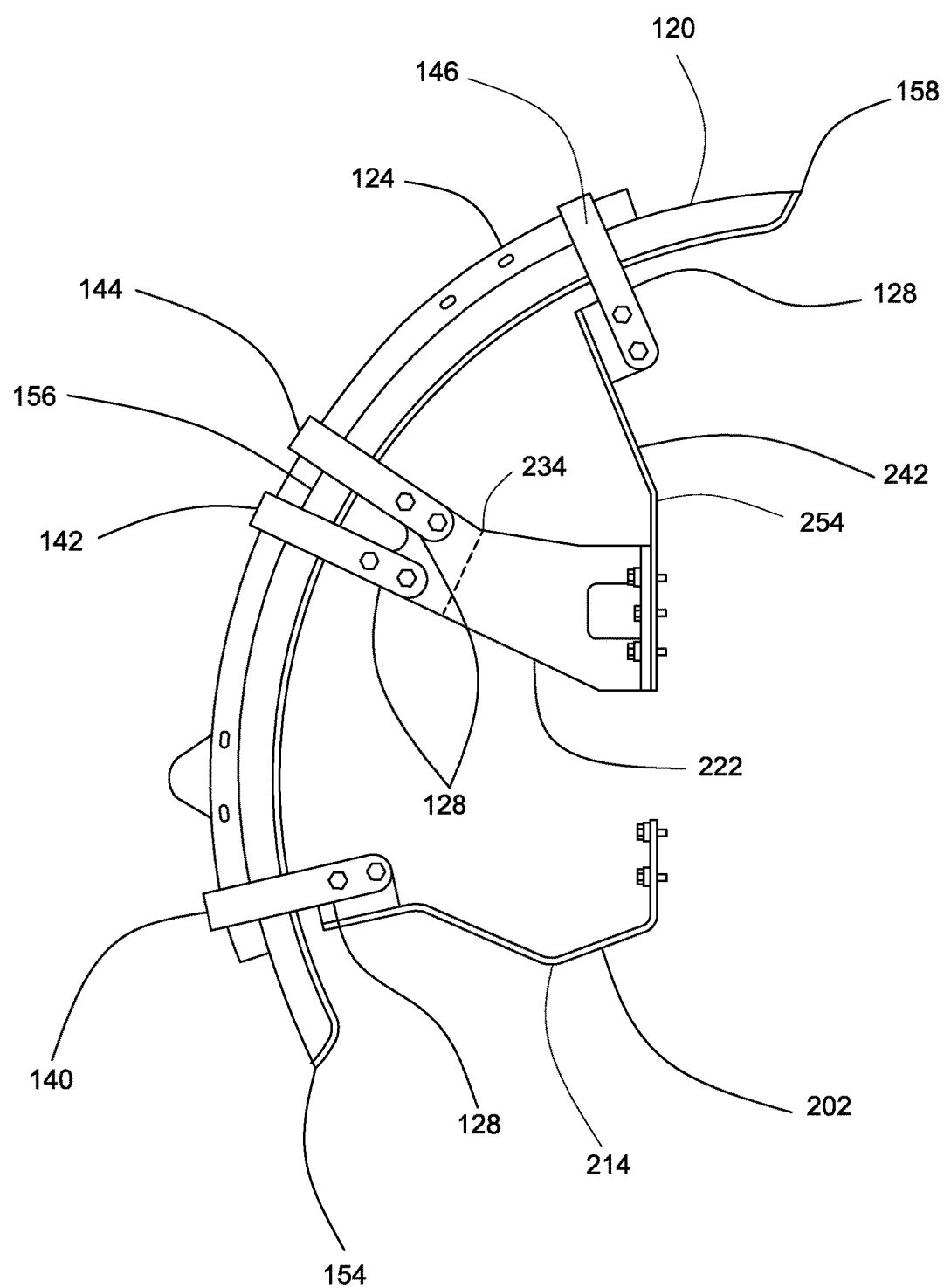
FIG. 4 is a side elevational view of the embodiment of FIG. 3 in a right-hand mounting configuration, the left-hand mounting configuration being approximately a mirror image thereof.
Figure 5:
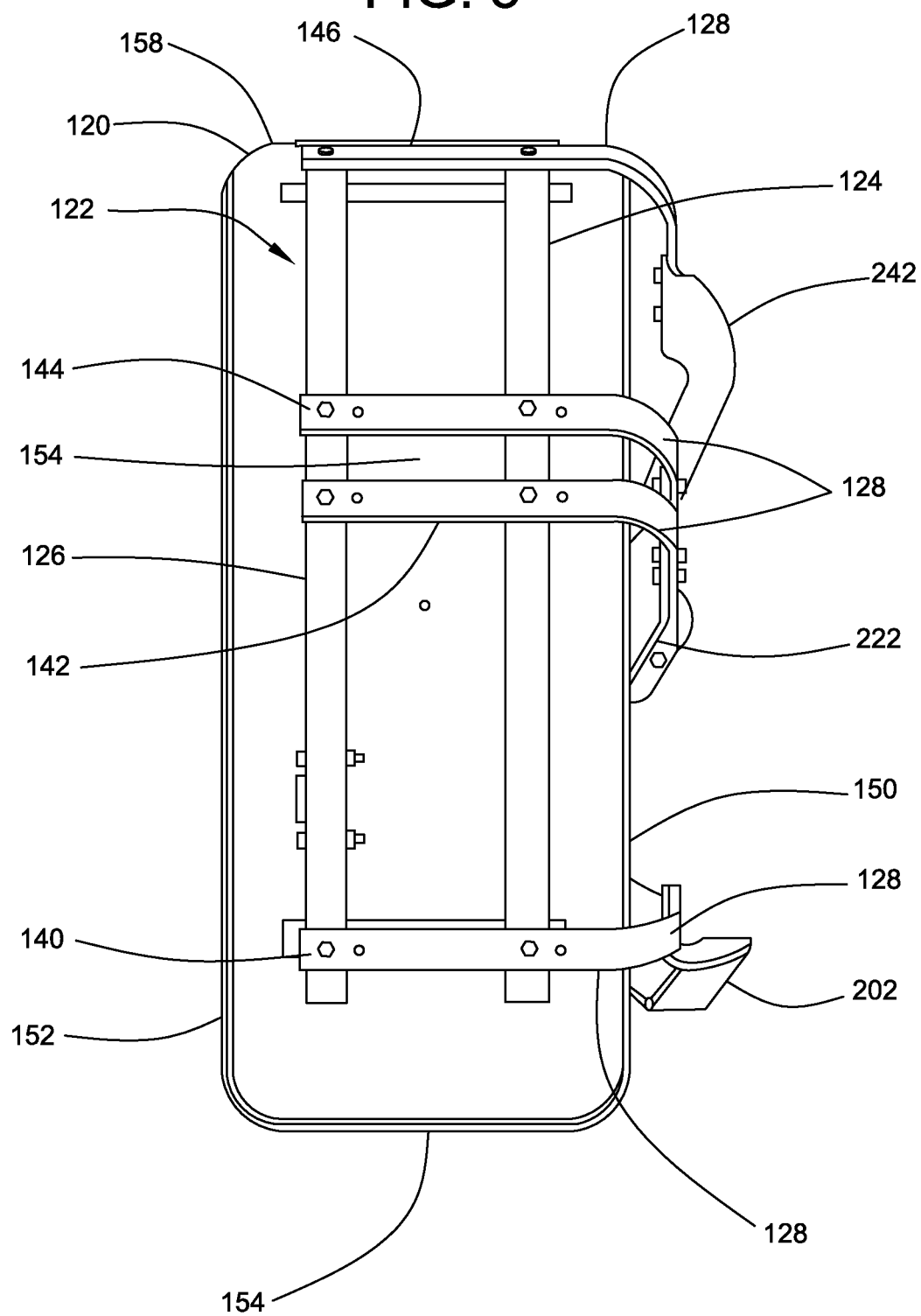
FIG. 5 is a top plan view looking outwardly of the mounting configuration of FIG. 4.

Referring to FIGS. 2 and 3, there is illustrated an embodiment of the fender 120 for partially covering a portion of a wheel, such as a front wheel 108. The fender 120 may have a curved shape corresponding to the round circumference of the wheel and with a slightly larger diameter. The fenders 120 may be supported by a fender frame 122 attached to an exterior surface thereof; however, in other embodiments, the fender frame may be attached along an inner surface of the fender or formed within the fender itself with exterior projections for connection to the frame of the machine. The fender frame 122 may include a first fender support 124 and a second fender support 126. In the disclosed embodiment, the first fender support 124 is positioned inboard of the second fender support 126 toward an inboard edge 150 of the fender so it will be oriented closer to the main structure of the implement frame. Accordingly, the second fender support 126 may be positioned adjacent an outboard edge 152 of the fender 120. Also, the disclosed first and second fender supports 124, 126 may be formed from square steel or aluminum tubing bent into an arcuate configuration, in this case an arc, matching the curved shape of the fender 120.

The fender frame 122 may include one or more support ties 128 connecting the first and second fender supports 124, 126. In the disclosed embodiment, the support ties 128 may include a support leg 130 and an attachment leg 132. In the disclosed embodiment, the support ties 128 may be formed from generally flat plate material, such as steel or aluminum, and bent so that the support leg 130 is approximately perpendicular to the attachment leg 132. The support leg 130 may be positioned perpendicular to the first and second fender supports 124, 126 and traverse across the fender frame 122 from the outboard edge 152 to the inboard edge 150 of the fender 120 so that the attachment leg 132 bends around the inboard edge and is oriented in a generally radial position toward an axle supporting the front wheel 108. Support leg 130 may be attached to the first and second fender supports 124, 126 by way of mechanical non-welded fasteners such as threaded fasteners, including bolts, nuts, screws, and the like.

In an embodiment with multiple support ties 128 as, for example, disclosed in FIG. 2, the support ties may be arranged axially across the fender 120 and radially spaced apart from each other with respect to the curve of the fender so that the fender is adequately supported along the length of its curve. The support ties may include a first support tie 140 that can be fastened to the first and second fender supports 124, 126 and disposed toward a leading radial edge 154 of the fender 120. When the fender 120 is mounted on the motor grader, the leading radial edge 154 can be disposed in the forward direction of the machine and corresponds to the forward edge of the curve of the fender. In addition, a second support tie 142 and a third support tie 144 can be disposed radially rearward of the first support tie 140 along the curve of the fender 120 and approximately located at a radial midsection 156 of the fender. A fourth support tie 146 can be fastened to the first and second fender supports 124, 126 and disposed toward a trailing radial edge 158 of the fender 120. When the fender 120 is mounted on the motor grader, the trailing radial edge 158 may be directed toward the rear, i.e., the aft direction, of the machine and may be partially directed downwards toward the ground. It will be appreciated that, as used herein, the terms "inboard," "outboard" "leading radial edge," "trailing radial edge" and "radial midsection" are relativistic terms used for orientation purposes and are not intended as a limitation on the claims unless explicitly stated therein.

Referring to FIG. 2, to attach the fender 120 to the motor grader or similar machine, the fender frame 122 can be connected to a part of the implement frame 104 of the motor grader that is operatively associated with the front wheel 108. In the particular embodiment illustrated, the fender frame 122 is mounted to a steering knuckle 160 that can be pivotally joined to the implement frame 104 and is used to pivot or turn the front wheels 108. In embodiments having an appropriate suspension system, the steering knuckle 160 may also be configured to vertically move together with the wheel with respect to the implement frame. The steering knuckle 160 can encircle and rotatably support a wheel hub 162 projecting from the front wheel 108 so that the front wheel can rotate with respect to the steering knuckle and the rest of the implement frame 104. The wheel hub 162 defines an axis line 164 for rotation of the front wheel 108 thereby establishing axial and radial orientations for the present disclosure. Two particular radial coordinates useful for orientation purposes and indicated in FIG. 2 by arrows include the fore/aft directions along line 166 and the vertical up/down directions along line 168, which are oriented with respect to the ground or other surface that the front wheel 108 of the machine contacts. To facilitate the connection with the fender frame 122, the steering knuckle 160 may have a first machine location 302 formed as a vertically oriented, flat surface set toward a forward radial side of the wheel hub 162 (see FIG. 3). Also included can be a second machine location 304 formed as a vertically oriented, flat surface set toward a rearward radial side of the wheel hub 162 (See FIG. 3). The steering knuckle 160 can include other features necessary to pivotally connect with the implement frame and rotatably support the wheel. However, it will be appreciated that, in other embodiments, the fender frame 122 can connect to other parts of the implement frame 104.

As depicted in FIGS. 2-6, the fender mounting system 200 of the present disclosure is configured to attach the fender frame 122 to the implement frame 104 of the motor grader 100 proximate to front wheels 108. The fender mounting system 200 can include a plurality of brackets, punched and pressed for instance from sheet material or bar stock, that are shaped and arranged to accommodate the vibrations and forces imparted on the fender due to its proximity to the wheels. In addition, the brackets can be selectively located about and depend from the radial curve of the fender to facilitate mounting to the appropriate positions of the frame of the machine. The brackets of the fender mounting system 200 can be arranged to support the fender 120 so that its curved shape generally corresponds to the circumference of the wheel and so that curve of the fender is generally aligned with the axis line 164 of rotation of the front wheel 108.

For example, the fender mounting system 200 may include a first bracket 202. The first bracket 202 may include a first mounting portion 204 configured to attach to the implement frame 104 and a first attachment portion 206 configured to attach to fender frame 122. In the illustrated embodiment, the first attachment portion 206 can be configured for attachment to the first support tie 140 of the fender frame 122 so that the first bracket 202 is attached proximate to the leading radial edge 154 of the curve of the fender 120. The first attachment portion 206 may be shaped so that, when attached to the first support tie 140, the first bracket 202 is generally oriented to radially depend toward the axis line 164 associated with the wheel hub 162.

To join the first attachment portion 206 to the first mounting portion 204, the first bracket 202 may further include a first extension leg 208 extending between the first mounting portion and the first attachment portion. To reinforce the first bracket 202 against induced vibrations and forces, the first extension leg 208 may be configured as a stress management portion and may include a first major surface 210 (indicated by opposed arrows), a first minor surface 212 (indicated by a single arrow), and a first flection 214 (indicated in dashed lines). In the disclosed embodiment, the first major surface 210 may be configured as a planar surface defining an area larger than an area defined by the first minor surface 212. In the disclosed embodiment, the first major surface 210 may be adjacent to and perpendicular to the first minor surface 212. In other words, without limiting the scope of the attached claims, the first major surface 210 may be considered to be a width of the first extension leg 208 and the first minor surface 212 may be considered to be an edge of the first extension leg 208.

The first flection 214 may be located along the first major surface 210 perpendicular to the first minor surface 212. In the illustrated embodiment, the first flection 214 may be formed as a bend or crease disposed into the planar area of the first major surface 210 that traverses the width of the first extension leg 208. In the case where the brackets are made from sheet materials or bar stock, the first flection may be formed by a press brake or the like. Because of the first flection 214, the first extension leg 208 may include a first sub-leg 216 and a second sub-leg 217 arranged in an angled relationship with each other. The angled relationship may be less than 90° and maybe approximately on the order of 30° to 50°, and more approximately about 44°. In the illustrated embodiment, the first sub-leg 216 depending from the first attachment portion 206 may be oriented to direct the first extension leg 208 radially forward with respect to the axis line 164 and the fore/aft directions along line 166 and the second sub-leg may be oriented to direct the first mounting portion 204 back toward the axis line 164 with respect to the fore/aft directions. In an embodiment, the first mounting portion 204 may be formed as a mounting foot and may be bent with respect to the second sub-leg 217 so that the first mounting portion is positioned in a horizontal plane generally above and radially forward of the axis line 164 along the fore/aft directions.

The fender mounting system 200 may also include a second bracket 222. The second bracket 222 may include a second mounting portion 224 configured to attach to the implement frame 104 and a second attachment portion 226 configured to attach to the fender frame 122. In the illustrated embodiment, the second attachment portion 226 can be configured for attachment to the second support tie 142 and the third support tie 144 of the fender frame 122 so that the second bracket 222 is positioned proximate to the radial midsection 156 of the curve of the fender 120. The second attachment portion 226 may be shaped so that, when attached to the second and third support ties 142, 144, the second bracket 222 overall is generally oriented to radially depend toward the axis line 164 associated with the curve of the fender 120. The second attachment portion 226 may include a notch 227 formed therein so that the second attachment portion is bifurcated to attach separately to both the second support tie 142 and the third support tie 144.

To join the second attachment portion 226 to the second mounting portion 224, the second bracket 222 may further include a second extension leg 228 extending between the second mounting portion and the second attachment portion. To reinforce against induced vibrations and forces, the second extension leg 228 may be configured to include a second major surface 230 (indicated by opposed arrows), a second minor surface 232 (indicated by a single arrow), and a second flection 234 (indicated in dashed lines). In the disclosed embodiment, the second major surface 230 may be configured as a planar surface defining an area larger than an area defined by the second minor surface 232. In the disclosed embodiment, the second major surface 230 may be adjacent to and perpendicular to the second minor surface 232. In other words, without limiting the scope of the attached claims, the second major surface 230 may be considered to be a width of the second extension leg 228 and the second minor surface 232 may be considered to be an edge of the second extension leg 228. The width of second major surface 230 of the second extension leg 228 may be larger than the width of the first major surface 210 of the first extension leg 208.

The second flection 234 may be located along the second major surface 230 perpendicular to the second minor surface 232. In the illustrated embodiment, the second flection 234 may be formed as a bend or crease located in the planar area of the second major surface 230 and may traverse the width of the second extension leg 228 delineated by the second major surface. Because of the second flection 234, the second extension leg 228 may include a first sub-leg 236 and a second sub-leg 237 arranged in an angled relationship with each other. In an embodiment, best illustrated in FIGS. 2, 3, and 5, the first sub-leg 236 may initially depend from the second attachment portion 226 in an axial direction with respect to the axis line 164 and toward the outboard edge 152 of the fender 120. The second sub-leg 237 may extend from the first sub-leg 236 in the axial direction back toward the inboard edge 150 of the fender 120. The angle of the bend imparted into the second extension leg 228 by the second flection 234 may be less than the angle of the bend imparted into the first extension leg 208 by the first flection 214 and, in an embodiment, may be on the order of 5° to 20°, and more specifically may be on the order of 17°. In an embodiment, the second mounting portion 224 may be formed as a mounting foot and bent with respect to the second sub-leg 237 so that the second mounting portion is arranged in a generally horizontal plane above the axis line 164. Further, as illustrated, the second bracket 222 may include an aperture 238 disposed into the second extension leg 228 and the second mounting portion 224 in a transition region where the two parts bend with respect to each other.

The fender mounting system 200 may also include a third bracket 242. The third bracket 242 may include a third mounting portion 244 configured to attach to the implement frame 104 and a third attachment portion 246 configured to attach to the fender frame 122. In the illustrated embodiment, the third attachment portion 246 can be configured for attachment to the fourth support tie 146 so that the third bracket 242 extends from near the radial trailing edge 158 of the curved shape of the fender 120. The third bracket 242 may be shaped so that, when attached to the fourth support tie 146, the third bracket 242 is generally oriented to radially depend toward the axis line 164.

To attach the third attachment portion 246 to the third mounting portion 244, the third bracket 242 may further include a third extension leg 248 located between the third mounting portion and the third attachment portion. To reinforce the third bracket 242 against induced vibrations and forces, the third extension leg 248 may be configured as a stress management portion and may include a third major surface 250 (indicated by opposed arrows), a third minor surface 252 (indicated by a single arrow), and a third flection 254 (indicated in dashed lines). In the disclosed embodiment, the third major surface 250 may be configured as a planar surface defining an area larger than an area defined by the third minor surface 252. In the disclosed embodiment, the third major surface 250 may be adjacent to and perpendicular to the third minor surface 252. In other words, and without limiting the scope of the attached claims, the third major surface 250 may be considered to be a width of the third extension leg 248, and the third minor surface 252 may be considered to be an edge of the third extension leg 248. The width of the third major surface 250 of the third extension leg 248 may be less than the width of the second major surface 230 of the second extension leg 228.

Figure 6:
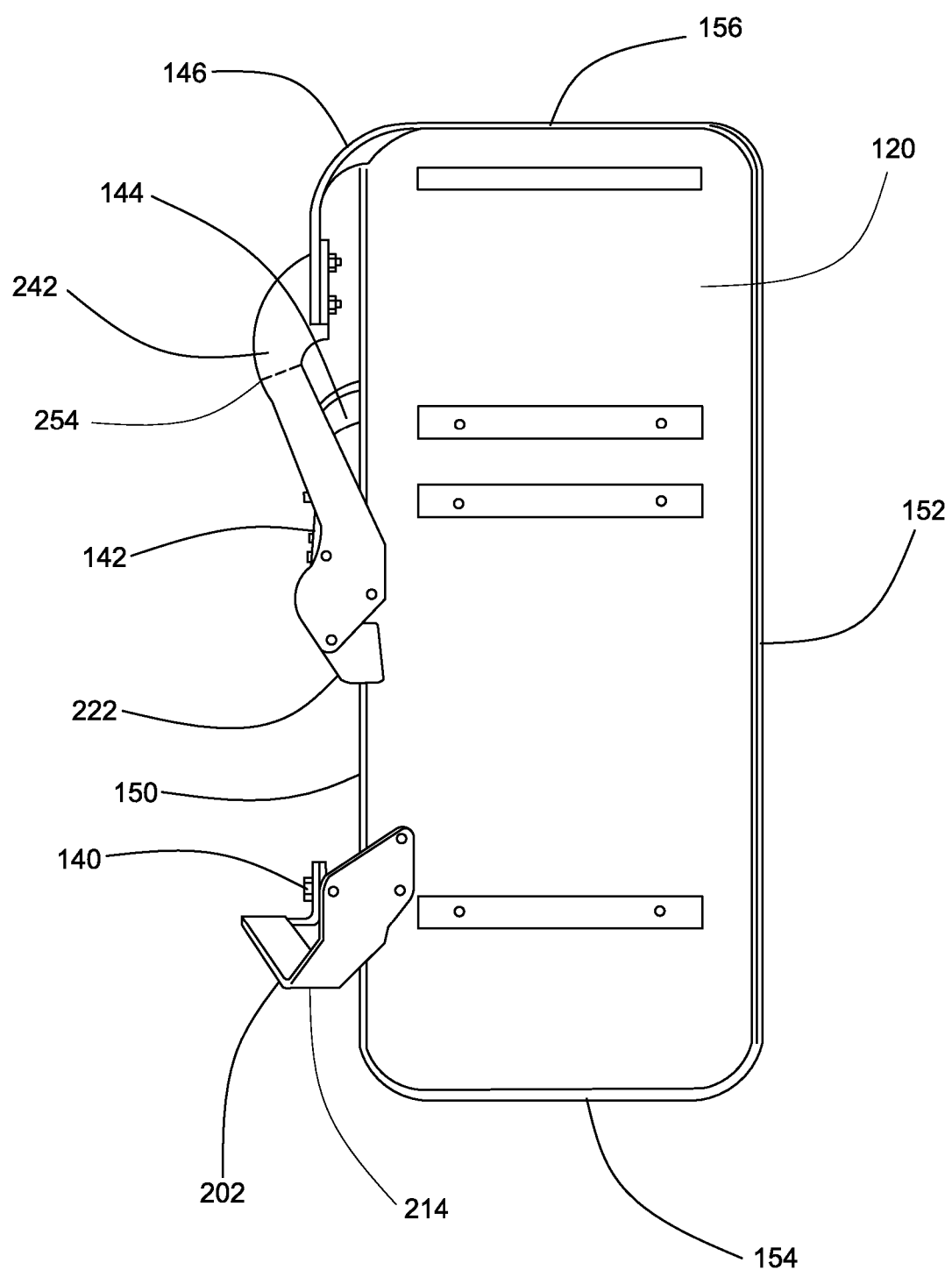
FIG. 6 is a bottom plan view of the mounting configuration of FIG. 4.

The third flection 254 may be located along the third major surface 250 perpendicular to the third minor surface 252. In the illustrated embodiment, the third flection 254 may be formed as a bend or crease located in the planar area of the third major surface 250 and traversing the width of the third major surface. Because of the third flection 254, the third extension leg 248 may include a first sub-leg 256 and a second sub-leg 257 arranged in an angled relationship with each other. In an embodiment, the angle imparted by the third flection may be on the order of 10° to 25°, and more specifically may be on the order of 22.7°. The first sub-leg 256 may extend from the third attachment portion 246 radially downward toward the axis line 164 and second sub-leg 257 may be oriented to direct the third mounting portion in a generally horizontal plan above the axis line 164. In addition, the first sub-leg 256 may be curved along its third minor surface 252 such that, from the third attachment portion 246, the first sub-leg is initially directed axially inboard with respect to the inboard edge 150 of the fender 120 and then redirected outboard to depend back under the inboard edge of the fender. Accordingly, as best illustrated in FIG. 6, the third bracket 242 jogs away from and then back toward the inboard edge 150 of the fender 120.

INDUSTRIAL APPLICABILITY

The fender mounting system 200 of the present disclosure attempts to mitigate stresses caused by vibration and weight loading to provide improved service life. The bend or angle located in the major surfaces of the brackets by the flections can function as a spring that may allow the brackets to flex or bend, even if only slightly or microscopically, along the flections to dissipate vibrations and forces that are generally perpendicular to the flections. In addition, the flections resist vibrations and forces that are oriented parallel to the flections. Accordingly, the overall shape of the extension legs including the first and second sub-legs of the major surfaces due to the flections direct the forces and vibrations in advantageous orientations to reduce the chance of failure. The brackets can also be arranged about the radius of the curve of the fender to advantageously dissipate and/or resist these vibrations and forces. Furthermore, the brackets can be arranged so that the first flection of the first bracket dampens forces in two directions, while resisting forces in a third direction while the second bracket and possibly the third bracket can be arranged so the second and third flections dampen and resist forces in directions different than the first flection. The fender mounting system overall reduces the possibility of failure due to the imparted vibrations and forces.

In the disclosed embodiment, the first bracket 202 is attached to the first support tie 140 proximate the leading radial edge 154 of the fender 120 and depends toward the axis line 164 of rotation of the front wheel which the curve of fender 120 is supported about and aligned with. Further, the first bracket 202 may be oriented with the first minor surface 212 perpendicular to a wheel axle aligned with the axis line 164. Therefore, the first major surface 210 may be oriented generally parallel to the axis line 164 so that the first extension leg 208 resists lateral forces in the inboard/outboard directions directed axially with respect to the axis line 164. Meanwhile, the first flection 214 allows the first extension leg 208 to deflect in response to forces in the fore/aft directions along line 166 and the up/down directions along line 168 of the machine. The first mounting portion 204 is configured to attach to the implement frame 104 at a first machine location 302. Referring to FIGS. 2 and 3, to facilitate mounting, in an embodiment, the first machine location 302 may be formed on the steering knuckle 160 as a vertically oriented, flat surface located forward of the wheel hub 162 along the fore/aft directions that correspond in location and orientation with the first mounting portion 204.

The second bracket 222 is attached to the second and third support ties 142, 144 by the second attachment portion 226 which is bifurcated proximate the radial midsection 156 of the fender 120 and depends radially toward the axis line 164. Further, the second bracket 222 may be oriented with the second major surface 230 perpendicular to the wheel axle so that the second minor surface 232 is generally parallel with the axis line 164. Therefore, the second major surface 230 may be oriented so that the second extension leg 228 resists forces in the fore/aft directions along line 166. Further, the second flection 234 allows the second extension leg 228 to deflect in response to lateral forces in the inboard/outboard directions aligned with the axis line 164 and the up/down directions along line 168. The second mounting portion 224 is configured to attach to the implement frame 104 at a second machine location 304. Referring to FIGS. 2 and 3, in an embodiment to facilitate mounting, the second machine location 304 can be formed as a vertically oriented, flat surface on the steering knuckle 160 that is located rearward of the wheel hub 162 along the fore/aft directions.

The fender mounting system 200 may also include a third bracket 242 attached to the fourth support tie 146 proximate the trailing radial edge 158 that depends radially toward the axis line 164. The third bracket 242 may be shaped and oriented to have the third minor surface 252 perpendicular to the axis line 164. Accordingly, the third major surface 250 may be oriented generally parallel to the axis line 164 so that the third extension leg 248 resists lateral forces in the inboard/outboard directions generally parallel with the axis line 164. Meanwhile, the third flection 254 allows the third extension leg 248 to deflect in response to forces in the up/down directions along line 168 and the fore/aft directions along line 166. The third mounting portion 244 is configured to attach to the implement frame 104 at a second machine location 304 corresponding to the attachment point of the second mounting portion 224. In an embodiment, referring to FIGS. 2 and 3, the second machine location 304 can be formed as a vertically oriented flat surface on the steering knuckle 160 rearward of the wheel hub 162 along the fore/aft directions.

It will be appreciated that the present disclosure provides an effective and efficient mechanism for mounting a fender to control stresses from various loadings. The described system improves fatigue life over present fender mounting arrangements.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A mounting system for mounting a fender having a generally curved shape to a mobile machine such that a curve of the fender is generally aligned with an axis line associated with a wheel of the mobile machine and is disposed partially around a circumference of the wheel, the mounting system comprising:

a first bracket including a first mounting portion adapted to mount to a frame of the mobile machine at a first machine location proximate a wheel hub, a first attachment portion adapted to connect proximate to a leading radial edge of the fender, and a first extension leg between the first mounting portion and the first attachment portion, the first extension leg having a spring-like first flection adapted for resiliently deflecting in response to imparted forces on the fender, the first flection parallel to the axis line and providing an angle in the first extension leg;

a second bracket including a second mounting portion adapted to mount to the frame of the mobile machine at a second machine location proximate the wheel hub; a second attachment portion adapted to connect to a radial midsection of the fender; and a second extension leg between the first mounting portion and the first attachment portion, the second extension leg having a spring-like second flection adapted for resiliently deflecting in response to imparted forces on the fender, the second flection perpendicular to the axis line and providing an angle in the second extension leg; and wherein the first extension leg includes a first sub-leg extending forward from the first attachment portion in a fore/aft direction and a second sub-leg extending back to the first mounting portion in the fore/aft direction.

2. The mounting system of claim 1, wherein the first extension leg includes a first major surface and a first minor surface perpendicular to the first major surface.

3. The mounting system of claim 2, wherein the first flection traverses the first major surface.

4. The mounting system of claim 1, wherein the second extension leg includes a second major surface and a second minor surface perpendicular to the second major surface.

5. The mounting system of claim 4, wherein the second flection traverses the second major surface.

6. The mounting system of claim 1, wherein the second extension leg includes a first sub-leg extending axially inboard with respect to the fender from the second attachment portion and a second sub-leg extending axially outboard with respect to the fender to the second mounting portion.

7. The mounting system of claim 1, further comprising:
a third bracket including a third mounting portion adapted to mount to the frame of the mobile machine at the second machine location proximate the wheel hub, a third attachment portion adapted to connect proximate to a trailing radial edge of the fender, and a third extension leg disposed between the third mounting portion and the third attachment portion, the third extension leg having a spring-like third flection adapted for resiliently deflecting in response to imparted force on the fender, the third flection parallel to the axis line and providing an angle in the third extension leg.

8. The mounting system of claim 7, wherein the third extension leg includes a third major surface and third minor surface perpendicular to the third major surface, the third flection traversing the third major surface.

9. The mounting system of claim 8, wherein the third extension leg includes a first sub-leg extending from the third attachment portion initially in an axial direction and then in an radial direction and a second sub-leg extending to the third mounting portion.

10. The mounting system claim 7, wherein:
the first extension leg includes a first major surface;
the second extension leg includes a second major surface; and
the third extension leg includes a third major surface;
wherein a first width of the first major surface and a third width of the third major surface are less than a second width of the second major surface.

11. The mounting system of claim 1, wherein:
the first attachment portion of the first bracket attaches to the fender via a first support tie having a support leg traversing the fender and an attachment leg disposed radially inward; and
the second attachment portion of the second bracket attaches to the fender via a second support tie having a support leg traversing the fender and a second attachment leg disposed radially inward.

12. The mounting system of claim 11, wherein the support leg of the first support tie and the support leg of the second support tie attach to a fender support radially disposed along the fender.

13. A mounting system for mounting a fender to a mobile machine having fore/aft directions, inboard/outboard directions, and up/down directions, the mounting system comprising:
a first bracket including a first mounting portion adapted to mount to a frame of the mobile machine, a first attachment portion adapted to connect to the fender disposed partially around a wheel of the mobile machine, and a first extension leg between the first mounting portion and the first attachment portion, the first extension leg having a first major surface and a first spring-like flection traversing the first major surface allowing resilient deflection of the fender in the fore/aft directions and the up/down directions;
a second bracket including a second mounting portion adapted to mount to the frame of the mobile machine, a second attachment portion adapted to connect to the fender, and a second extension leg between the second mounting portion and the second attachment portion, the second extension leg having a second major surface and a second spring-like flection traversing the second major surface allowing resilient deflection in the inboard/outboard directions and the up/down directions; and
a third bracket having a third mounting portion adapted to mount to the frame and a third attachment portion adapted to attach to the fender.

14. The mounting system of claim 13,
wherein the third bracket includes a third extension leg between the third mounting portion and the third attachment portion, the third extension leg having a third major surface and a spring-like third flection traversing the third major surface allowing resilient deflection of the fender in fore/aft directions and the up/down directions.

15. The mounting system of claim 14, wherein the fender has a generally curved shape and is mounted such that a curve of fender is aligned with an axis line of the wheel of the mobile machine.

16. The mounting system of claim 15, wherein the first flection and the third flection are aligned parallel to the axis line.

17. The mounting system of claim 16, wherein the second flection is aligned perpendicular to the axis line.

* * * * *